United States Patent [19]
Kennedy et al.

[11] Patent Number: 5,504,802
[45] Date of Patent: Apr. 2, 1996

[54] COMMUNICATION SYSTEM APPARATUS FOR TRANSMITTING AND RECEIVING DATA HAVING A RADIO WIRELINE INTERFACE

[75] Inventors: Paul R. Kennedy, Mesa; William C. Yip, Scottsdale; Timothy G. Hall, Mesa, all of Ariz.

[73] Assignee: Motorola, Inc., Schaumburg, Ill.

[21] Appl. No.: 103,389

[22] Filed: Aug. 9, 1993

[51] Int. Cl.⁶ .................................................... H04Q 7/38
[52] U.S. Cl. .................. 379/58; 358/434; 375/222; 455/18; 455/74
[58] Field of Search ................................ 379/58; 380/21; 455/18, 74; 358/434; 375/8

[56] References Cited

U.S. PATENT DOCUMENTS

| | | | |
|---|---|---|---|
| 3,806,804 | 4/1974 | Mills et al. | 379/58 |
| 4,331,834 | 5/1982 | Ganz et al. | 379/58 |
| 4,621,366 | 11/1986 | Cain et al. | 375/8 |
| 4,815,128 | 3/1989 | Malek | 380/9 |
| 4,837,812 | 6/1989 | Takahashi et al. | 379/98 |
| 4,922,546 | 5/1990 | Takahashi | 455/74 |
| 5,041,917 | 8/1991 | Koshiishi | 358/434 |
| 5,133,081 | 7/1992 | Mayo | 455/18 |
| 5,321,722 | 6/1994 | Ogawa | 375/8 |

Primary Examiner—Curtis Kuntz
Assistant Examiner—William Cumming
Attorney, Agent, or Firm—Sherry J. Whitney; Frederick M. Fliegel

[57] ABSTRACT

A digital satellite communication system including a local terminal coupled to a radio wireline interface through a radio satellite network. The radio wireline interface connects the radio satellite network to a public switched telephone network and a remote communication terminal. The system includes a novel method of establishing an end-to-end communication channel between local and remote terminals wherein the local terminal establishes a direct digital channel between itself and the radio wireline interface and transmits a message describing its signaling capabilities to the radio wireline interface. The radio wireline interface then trains its modem with the modem of the remote terminal such that the signaling capabilities of the local terminal are not violated. By moving the modem training procedure to the radio wireline interface, modem training response delays caused by the radio satellite network do not affect the success of establishing the end-to-end communication channel.

19 Claims, 7 Drawing Sheets

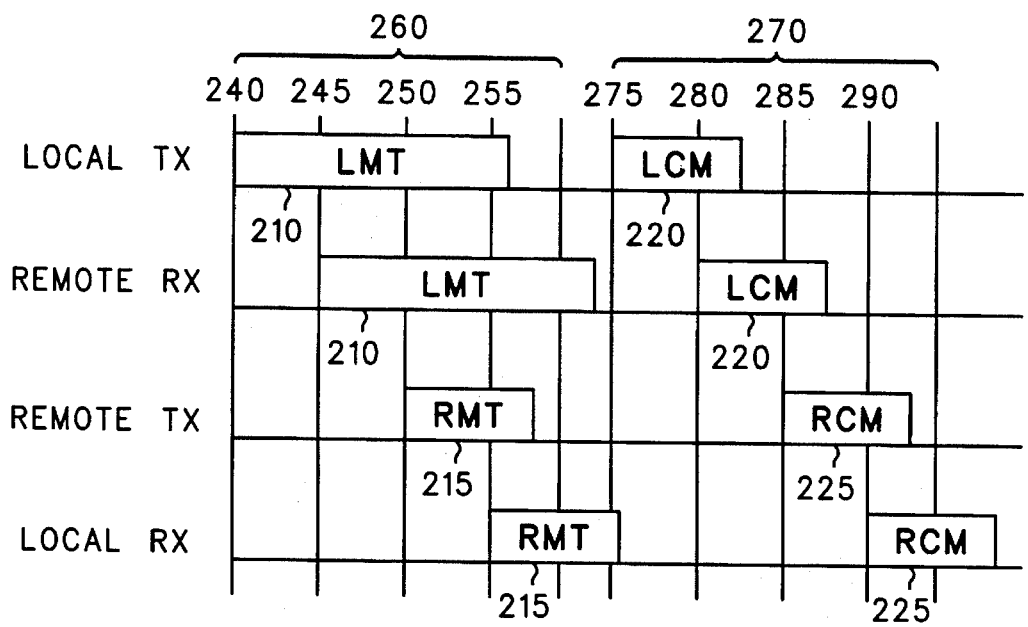
FIG. 2 - PRIOR ART -
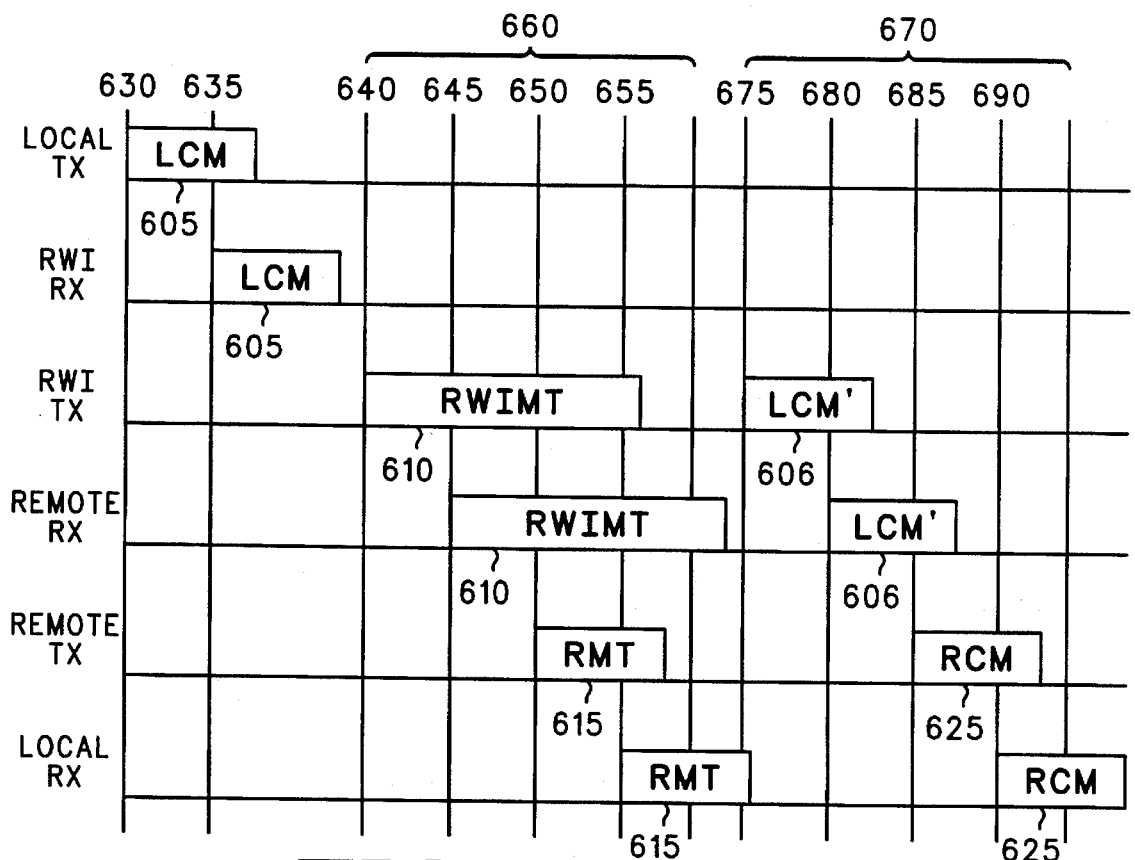
FIG. 6

COMMUNICATION SYSTEM APPARATUS FOR TRANSMITTING AND RECEIVING DATA HAVING A RADIO WIRELINE INTERFACE

CROSS-REFERENCE TO RELATED APPLICATION

This application is related to U.S. patent application Ser. Nos. 052,438, filed on Apr. 23, 1993 now U.S. Pat. No. 5,341,427; 991,054, filed on Dec. 15, 1992, now U.S. Pat. No. 5,341,426, and to U.S. Pat. Nos. 5,230,020, issued on Jul. 20, 1993 and 5,179,591, issued on Jan. 12, 1993, which are assigned to the same assignee as the present application and which are hereby incorporated herein by reference.

FIELD OF THE INVENTION

This invention relates in general to the field of modem training within a digital communications system, in particular to modem training within a digital satellite communication system and more particularly to modem training within a secure digital satellite communication system employing both radio and landline communication equipment.

BACKGROUND OF THE INVENTION

A "local terminal" is defined herein to mean a communication device which is the initiator of an attempt to establish a digital communication channel with another communication device. A "remote terminal" is defined herein to mean a communication device which is the responder to an attempt by the local terminal to establish a digital communication channel.

For example, a secure telephone unit (STU) is capable of establishing a "secure" communication channel with another STU. Secure communications comprises encrypting, transmitting, receiving and decrypting digital data. The modem training procedure begins when one STU "initiates" the establishment of the secure communication channel (e.g., the user of one STU presses the "secure" button).

FIG. 1 depicts an inoperative configuration of conventional communication system 101. Communication system 101 comprises local terminal 110, modems 114, 138, radio units 118, 132, 134, communication satellites 130, public switched telephone network 141 (PSTN), analog links 112, 140, 150, RF digital links 120, digital links 116, 136 and remote terminal 152. PSTN 141 comprises, for example, communication satellites 131 and terrestrial telephone networks 142, 146, 148 (TTNs). TTNs 142, 146, 148 communicate with communication satellites 131 via RF analog links 144. TTNs 142, 146, 148 may alternatively be interconnected via wirelines (not illustrated in FIG. 1). Links 112, 116, 136, 140 and 150 are wireline links and links 120 and 144 are RF satellite links.

Local terminal 110 and remote terminal 152 produce digital bitstreams modulated by internal modems (not illustrated in FIG. 1) to produce modulated carriers that may be transmitted via analog links 112 and 150, respectively. For example, when local terminal 110 and remote terminal 152 are STUs, their internal modems may produce encrypted modulated carriers. Modulated carriers received via analog links 112 and 150 are demodulated by the internal modems of local terminal 110 and remote terminal 152 to produce digital bitstreams that may be processed by terminals 110, 152.

Modems 114, 138 modulate incoming digital bitstreams and demodulate incoming modulated carriers. As a result, signals communicated via analog links 112, 140, 150 and RF analog links 144 are modulated carriers and signals communicated via RF digital links 120 and digital links 116, 136 are digital bitstreams.

Satellites 130 are narrow-band digital satellites. Signals communicated via RF digital links 120 may be limited to bandwidths as low as 2400 bits per second (bps). Satellites 131 are wide-band satellites having bandwidths of 32 per second (kbps) or 64 kbps, for example. Signals communicated via RF analog links 144 comprise trunked channels from TTNs 142, 146, 148.

For example, local terminal 110, analog link 112, modem 114, digital link 116 and radio units 118, 132 may be located off shore. Radio unit 134, digital link 136, modem 138, analog links 140, 150, PSTN 141 and remote terminal 152 may be land-based equipment.

A "satellite hop" is defined herein to mean a communication path from a system node (e.g., radio unit 118, TTN 142, etc.) up to a satellite and down to another system node or other communication apparatus. Multiple communication satellites 130 and system nodes may exist between local terminal 110 and land-based modem 138. Additional communication satellites 131 may exist between land-based modem 138 and remote terminal 152. FIG. 1 depicts a total of four satellite hops between local terminal 110 and remote terminal 152.

To establish a digital communication link within conventional communication system 101, the internal modem of local terminal 110 must "train" with the internal modem of remote terminal 152 to adaptively equalize the line and set near and far echo taps for echo cancellation. This is all performed digitally within the internal modems as part of the modem training procedure. Near the beginning of the modem training procedure, messages describing modem capabilities may be exchanged between internal modems so that the internal modems may determine a desired data rate, among other things. For some modes of operation, capabilities messages need not be exchanged.

FIG. 2 represents the timing of modem training messages exchanged between local terminal 110 and remote terminal 152 for an operative configuration of conventional communication system 101. As used in FIG. 2, "tx" is an abbreviation for "transmit" and "rx" is an abbreviation for "receive".

Referring also to FIG. 1 and associated text, the modem training procedure is initiated by local terminal 10. Modems 114 and 138 increase the propagation time of the modem training signals through communication system 101. For example, modem 114 requires approximately 0.5 seconds to detect local modem tone 210 (referred to also as LMT). Other than adding delay, modems 114 and 138 are transparent during the modem training procedure between local terminal 110 and remote terminal 152.

Local terminal 110 transmits local modem tone 210 to remote terminal 152 beginning at time 240. For example, local modem tone 210 may be a 2100 Hz tone of limited duration. Local terminal 110 continues transmission of local modem tone 210 until local terminal 110 begins reception of remote modem tone 215 (referred to also as RMT).

Remote terminal 152 receives local modem tone 210 beginning at time 245. Remote terminal 152 may then wait a certain signaling delay time and transmit remote modem tone 215 to local terminal 110 beginning at time 250. For example, remote modem tone 215 may be a P1800 Hz tone of limited duration. A P1800 (or "Pseudo" 1800) Hz tone consists of alternations of dibits 00 and 10, corresponding to +45 degree and −45 degree phase shifts, respectively.

Local terminal 110 receives remote modem tone 215 beginning at time 255. First response time-out interval 260, monitored by local terminal 110, begins at time 240 when local terminal 110 starts transmitting local modem tone 210. Local terminal 110 "fails the call" (e.g., hangs up) if it does not begin receiving remote modem tone 215 within first response time-out interval 260. Alternatively, local terminal 110 may re-initiate the modem training procedure to attempt to establish communications with remote terminal 152.

Capabilities messages 220, 225 are exchanged by local terminal 110 and remote terminal 152 indicating the "capabilities" of each terminal's internal modem. The exchanged capabilities messages 220, 225 are interpreted according to a predetermined hierarchy to arrive at negotiated parameters (e.g., data rate, etc.) which determine how further communications will be handled. Capabilities messages 220, 225 contain information the terminals use to select a common mode of operation (e.g., a negotiated data rate of 4800 bits per second).

Local terminal 110 transmits local capabilities message 220 (referred to also as LCM) beginning at time 275. Remote terminal 152 receives local capabilities message 220 beginning at time 280.

Remote terminal 152 transmits remote capabilities message 225 (referred to also as RCM) beginning at time 285. Remote capabilities message 225 is received by local terminal 110 beginning at time 290. Second response time-out interval 270, monitored by local terminal 110, begins at time 275, when local terminal 110 starts transmitting local capabilities message 220. Local terminal 110 fails the call if it does not begin receiving remote capabilities message 225 within second response time-out interval 270. Alternatively, local terminal 110 may re-initiate the modem training procedure to attempt to establish communications with remote terminal 152.

FIG. 3 is a flow diagram of a prior art protocol for local terminal modem training and capabilities message exchange. Referring also to FIGS. 1 and 2 and associated text, local terminal modem training and capabilities message exchange begins (block 310) when local terminal 110 transmits local modem tone 210 (block 315). Local terminal 110 starts an internal timer (block 320) when it begins transmission of local modem tone 210. Local terminal 110 then determines whether the internal timer value exceeds first response time-out interval 260 (block 325). When the internal timer value exceeds first response time-out interval 260 (block 325), local terminal 110 assumes remote terminal 152 is nonexistent or incapable of establishing communications and local terminal 110 fails the call (block 355), thus terminating the modem training procedure. For example, 3.3 +/−0.7 seconds is a standard first response time-out interval within the telecommunications industry.

When the internal timer value does not exceed first response time-out interval 260 (block 325), local terminal 110 determines whether remote modem tone 215 has been received (block 330). When remote modem tone 215 has not been received (block 330), local terminal 110 again determines whether first response time-out interval 260 has been exceeded (block 325). The procedure then iterates as shown in FIG. 3.

When remote modem tone 215 has been received (block 330), local terminal 110 transmits local capabilities message 220 (block 335). Local terminal 110 starts an internal timer (block 340) when it begins transmission of local capabilities message 220. Local terminal 110 then determines whether the internal timer value exceeds second response time-out interval 270 (block 345). For example, 2.2 seconds is a standard second response time-out interval within the telecommunications industry.

When the internal timer value exceeds second response time-out interval 270 (block 345), local terminal 110 assumes that remote terminal 152 is inoperative and local terminal 110 fails the call (block 355), thus terminating the modem training procedure.

When the internal timer value does not exceed second response time-out interval 270 (block 345), local terminal 110 determines whether remote capabilities message 225 has been received (block 350). When remote capabilities message 225 has not been received (block 350), local terminal 110 again determines whether second response time-out interval 270 has been exceeded (block 345). The procedure then iterates as shown in FIG. 3.

When remote capabilities message 225 has been received (block 350), local terminal 110 continues the modem training procedure (block 360) at the negotiated data rate and in accordance with the requirements of the internal modems of local terminal 110 and remote terminal 152.

FIG. 4 is a flow diagram of a prior art protocol for remote terminal modem training and capabilities message exchange. Referring also to FIGS. 1 and 2 and associated text, remote terminal modem training and capabilities message exchange begins (block 410) when remote terminal 152 receives local modem tone 210 (block 415). Remote terminal 152 then waits a required signaling delay time (block 420). For example, a required signaling delay time may be zero seconds (no delay) or one second. After the required signaling delay time has expired (block 420), remote terminal 152 transmits remote modem tone 215 (block 425).

Remote terminal 152 then determines whether local capabilities message 220 has been received (block 440). When local capabilities message 220 has not been received, remote terminal 152 continues to monitor incoming data until local capabilities message 220 is received. When remote terminal 152 receives local capabilities message 220 (block 440), remote terminal 152 transmits remote capabilities message 225 (block 445). Remote terminal 152 then continues the modem training procedure (block 450) at the negotiated data rate and in accordance with the requirements of the internal modems of local terminal 110 and remote terminal 152.

A signal transmitted by a local terminal (e.g., local terminal 110, FIG. 1) through a single satellite hop experiences a time delay before it is received by a remote terminal (e.g., remote terminal 152, FIG. 1). The time delay results from the signal propagation time from the local terminal to the satellite and down to the remote terminal. The delay length depends on the distances between each terminal and the satellite.

Government performance specifications require that STUs operate over two satellite hops (e.g., satellites 131, FIG. 1) on the PSTN (e.g., PSTN 141, FIG. 1) side. Additionally, it is not uncommon to require two or more satellite hops (e.g., satellites 130, FIG. 1) between a terminal (e.g., local terminal 110, FIG. 1) and a PSTN interface (e.g., modem 138, FIG. 1). Therefore, a message may be transmitted through four or more satellite hops before reaching a final destination. Each satellite hop contributes additional time delay to the total message propagation time.

Table 1 summarizes approximate timing delays inherent in the four satellite hop inoperative configuration of conventional communication system 101 depicted in FIG. 1. As used in Table 1, "start" is the element number in FIG. 1 where the delay originates and "end" is the element number in FIG. 1 where the delay ends.

TABLE 1

| CONVENTIONAL COMMUNICATION SYSTEM TIMING DELAYS | | | |
|---|---|---|---|
| start | end | delay explanation | delay |
| 110 | 114 | local tone detect time | .5 sec |
| 114 | 138 | two satellite hops | .6 sec |
| 138 | 152 | two satellite hops | .6 sec |
| 152 | 138 | two satellite hops | .6 sec |
| 138 | 114 | two satellite hops | .6 sec |
| 114 | | detect of remote tone | .1 sec |
| 114 | 110 | modem processing delay | .1 sec |
| | | total | 3.1 sec |

The total round trip delay of 3.1 seconds for a system having four satellite hops exceeds the standard second response time-out interval of 2.2 seconds. The total round trip delay is 2.5 seconds with three total satellite hops. Thus, the prior art protocol does not work with three or four satellite hops between local terminal 110 and remote terminal 152.

With only two total satellite hops between local terminal 110 and remote terminal 152, the total round trip delay is 1.9 seconds. Therefore, the prior art protocol does work with two satellite hops. Additional network delays, typically hundreds of milliseconds, are not included in the estimates provided in Table 1. With these additional delays, the prior art protocol may not work with two satellite hops.

A significant drawback of the prior art protocol is that modem training response time-out intervals for a particular communications system may limit the number of satellite hops allowable between the local terminal and the remote terminal to as few as one or two satellite hops. However, for some applications, communications ability through four or more satellite hops is desirable.

Thus, what is needed is a practical, economical method and apparatus allowing successful modem training to occur when more than two satellite hops exist between the local terminal and the remote terminal. What is particularly needed is a modem training method and apparatus allowing two or more radio satellite hops and two or more land-based equipment (e.g., PSTN) satellite hops.

SUMMARY OF THE INVENTION

Accordingly, there is provided a new and improved method and apparatus for a modem training procedure over two or more satellite hops for a communication system that transmits and receives data.

In a preferred embodiment, the apparatus comprises a local communication terminal having local signaling capabilities including channel capabilities of a digital radio network, a remote communication terminal having a remote internal modem with remote modem capabilities, and a radio wireline interface coupled to the local communication terminal via the digital radio network and coupled to the remote communication terminal. The radio wireline interface comprises a radio wireline interface internal modem which receives a local signaling capabilities message transmitted by the local communication terminal prior to a modem training procedure between the radio wireline interface internal modem and the remote internal modem. By using the local signaling capabilities, the radio wireline interface internal modem is capable of training with the remote internal modem without violating the local signaling capabilities.

In a preferred embodiment, the method of establishing a communication link between the local communication terminal and the remote communication terminal through the radio wireline interface comprises the steps of sending a local signaling capabilities message describing the local signaling capabilities from the local communication terminal to the radio wireline interface, formatting the local signaling capabilities message into a reformatted signaling capabilities message which is consistent with a format required during the modem training procedure and performing the modem training procedure between the radio wireline interface internal modem and the remote internal modem.

BRIEF DESCRIPTION OF THE DRAWING

The invention is pointed out with particularity in the appended claims. However, a more complete understanding of the present invention may be derived by referring to the detailed description and claims when considered in connection with the figures, wherein like reference characters refer to similar items throughout the figures and:

FIG. 2 shows a timing diagram of a prior art protocol for modem training and capabilities message exchange;

FIG. 6 shows a timing diagram of a method of modem training and capabilities message exchange in accordance with the present invention;

Figure 1:
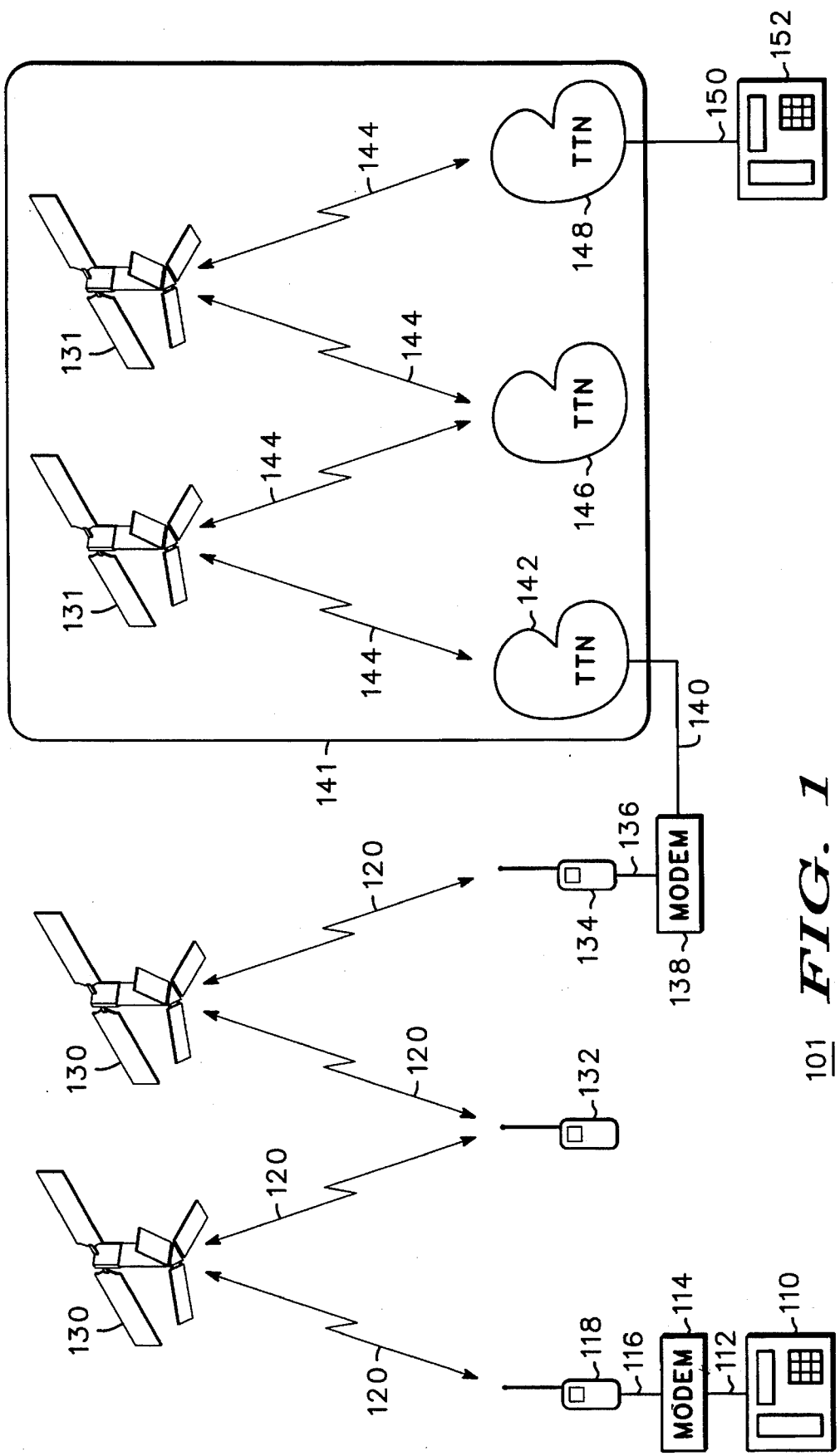
FIG. 1 shows an apparatus for an inoperative configuration of a conventional digital satellite communication system.
Figure 3:
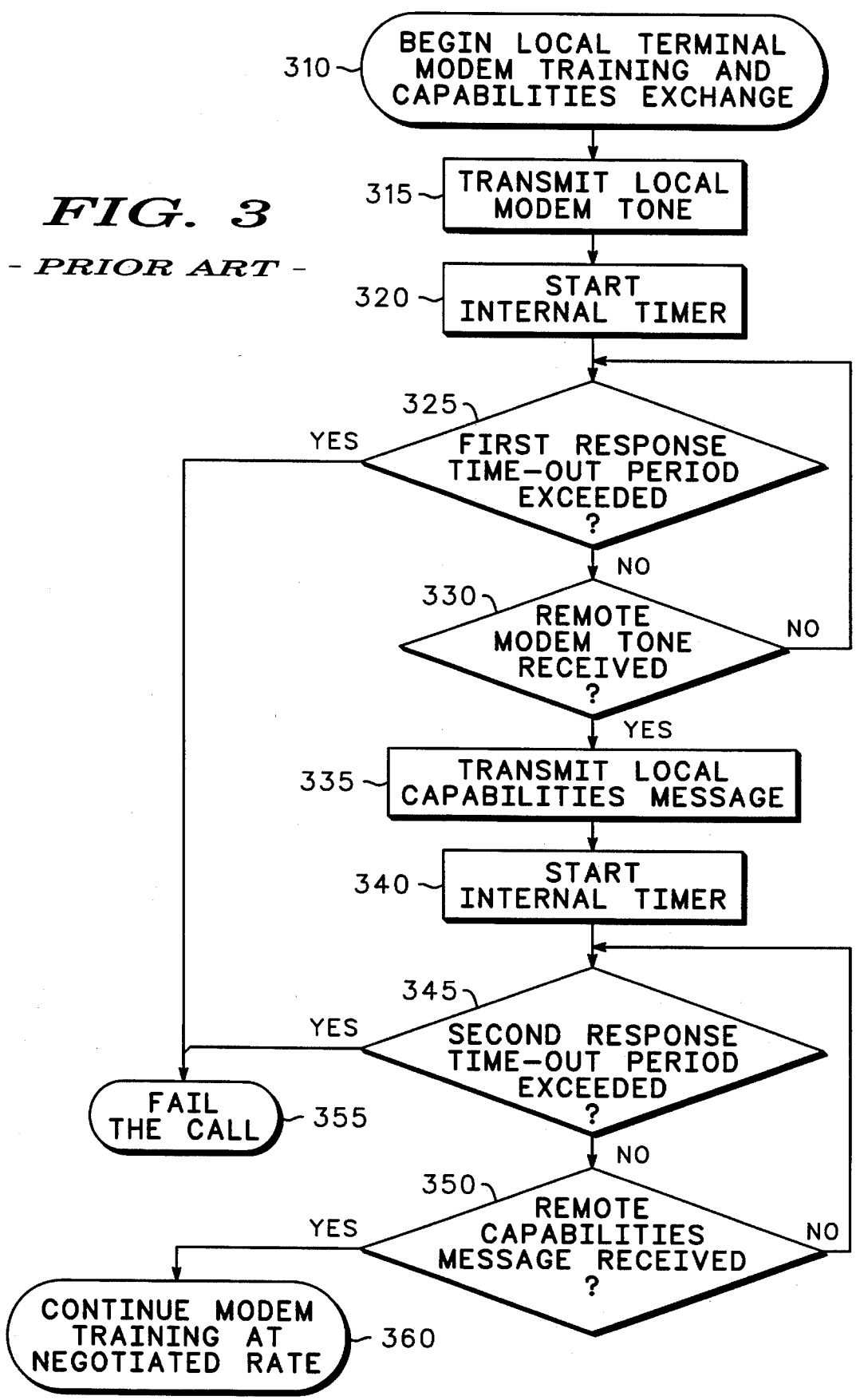
FIG. 3 shows a flow diagram of a prior art protocol for local terminal modem training and capabilities message exchange.
Figure 4:
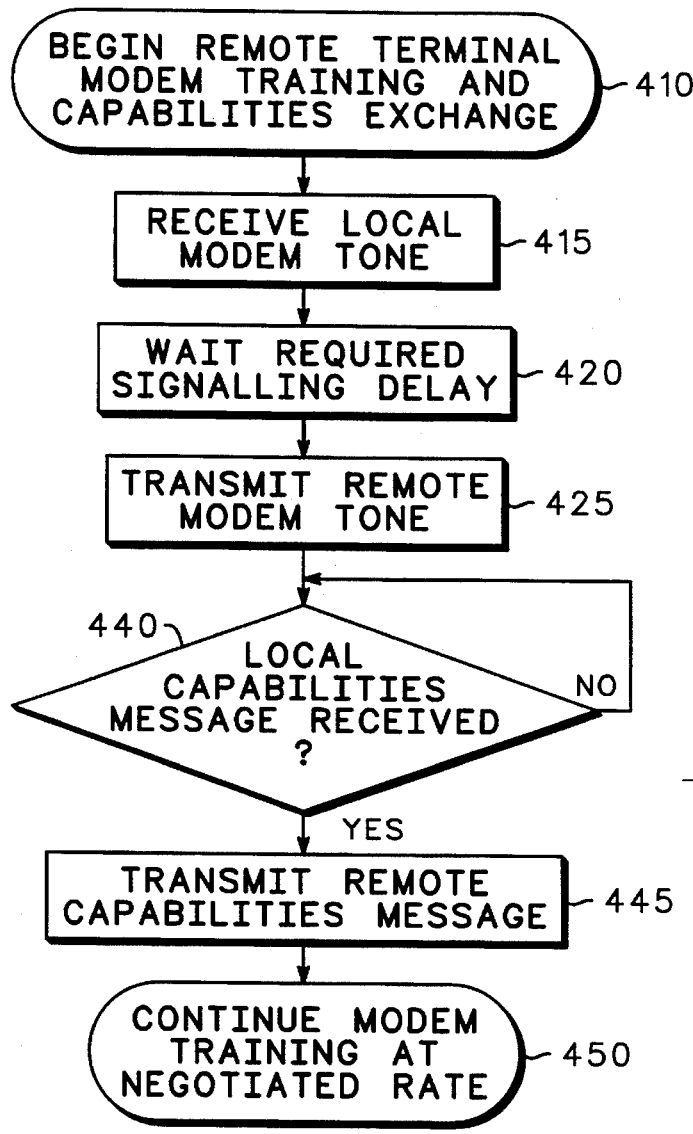
FIG. 4 shows a flow diagram of a prior art protocol for remote terminal modem training and capabilities message exchange.

The exemplification set out herein illustrates a preferred embodiment of the invention in one form thereof and such exemplification is not intended to be construed as limiting in any manner.

DETAILED DESCRIPTION OF THE DRAWING

In general, any terminal with data transmission and reception capabilities may operate as either an initiator (local terminal) or as a responder (remote terminal). Therefore, designation of a particular terminal as a local or remote terminal in the description of the present invention is not intended to be limiting in any manner.

Figure 5:
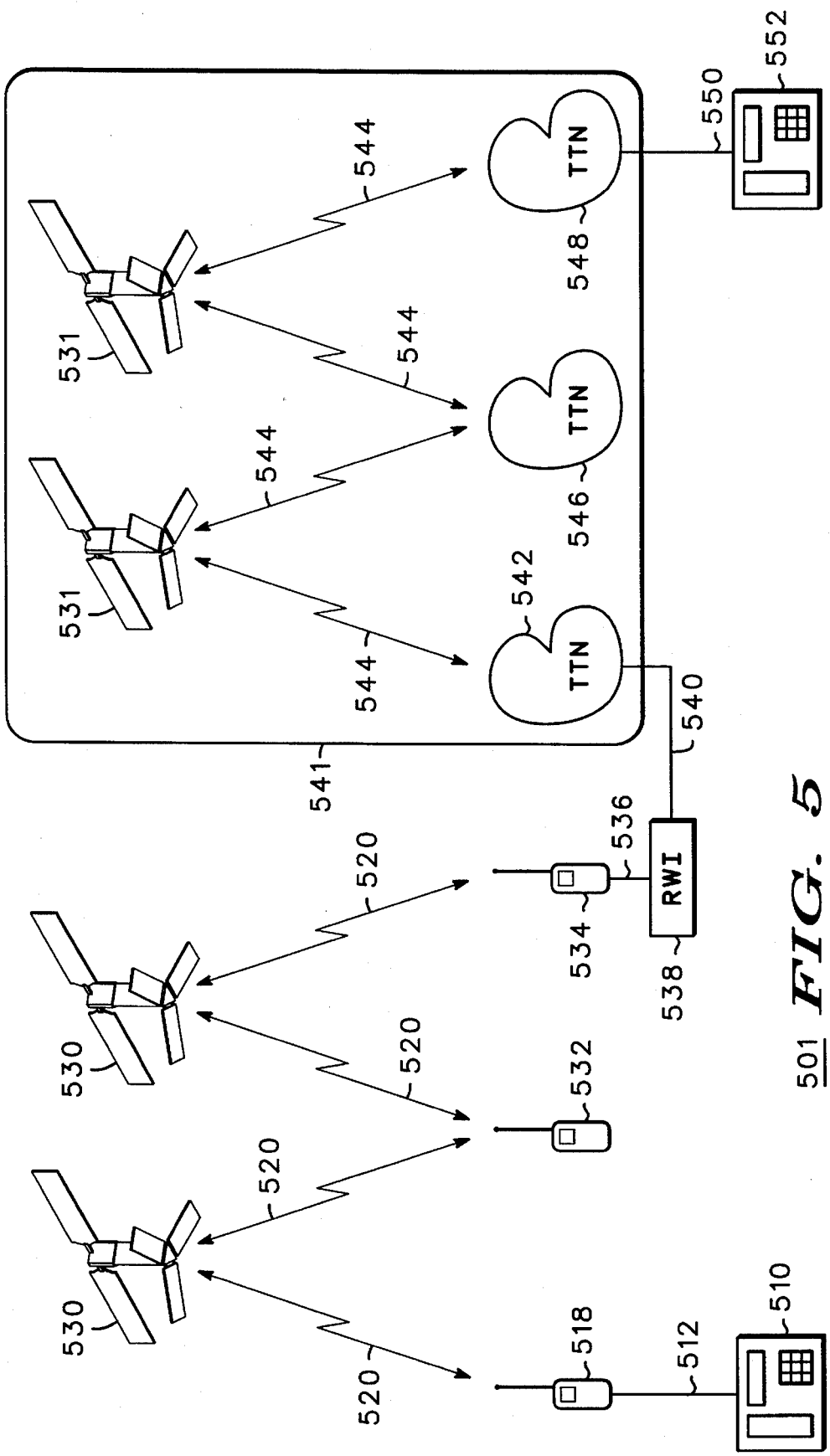
FIG. 5 shows an apparatus for a digital satellite communication system in accordance with the present invention.

FIG. 5 depicts a preferred embodiment of communication system 501. Communication system 501 comprises local terminal 510, radio units 518, 532, 534, communication satellites 530, radio wireline interface 538 (RWI), PSTN 541, analog links 540, 550, RF digital links 520, digital links 512, 536 and remote terminal 552. PSTN 541 comprises communication satellites 531 and TTNs 542, 546, 548. TTNs 542, 546, 548 communicate with communication satellites 531 via RF analog links 544. TTNs 542, 546, 548 may also be inter-connected via wirelines (not illustrated in FIG. 5).

For example, local terminal 510 and remote terminal 552 may be STUs that encrypt and decrypt data (e.g., digitized voice data), thus providing secure communications. RWI 538 is a communication device that interfaces between a digital radio network (e.g., radio units 518, 532, 534, satellites 530 and RF digital links 520) and a PSTN (e.g., PSTN 541). RWI 538 contains an internal modem (not illustrated in FIG. 5).

A "link" is defined herein to mean a communication path between a satellite (e.g., satellites 530, 531) and a system node (e.g., radio units 518, 532, 534 or TTNs 542, 546, 548). A "channel" is defined herein to mean a communication path between one communication device (e.g., local terminal 510, remote terminal 552 or RWI 538) and another.

Local terminal 510 and remote terminal 552 produce digital bitstreams. Used in conjunction with RWI 538, local terminal 510 may establish a direct digital bitstream channel between local terminal 510 and RWI 538. The direct digital bitstream channel between local terminal 510 and RWI 538 is referred to hereinafter as the "digital channel". The "end-to-end communication channel" is defined herein to mean a communication channel between local terminal 510 and remote terminal 552.

The bitstream produced by remote terminal 552 is modulated by its internal modem to produce a modulated carrier that may be transmitted via analog link 550.

A modulated carrier received via analog link 550 is demodulated by the internal modem of remote terminal 552 to produce a digital bitstream that may be processed by remote terminal 552. Signals communicated via analog links 540, 550 and RF analog links 544 are modulated carriers and signals communicated via RF digital links 520 and digital links 512, 536 are digital bitstreams.

Satellites 530 are narrow-band digital satellites. Satellites 531 are wide-band satellites having bandwidths of 32 kbps or greater. Signals communicated via RF analog links 544 are composed of trunked channels from TTNs 542, 546, 548.

For example, local terminal 510, digital link 512 and radio units 518, 532 may be located off shore. Radio unit 534, digital link 536, RWI 538, PSTN 541, analog links 540, 550 and remote terminal 552 may be land-based equipment.

Multiple communication satellites 530 may exist between local terminal 510 and RWI 538. Additional communication satellites 531 may exist between RWI 538 and remote terminal 552. FIG. 5 depicts a total of four satellite hops between local terminal 510 and remote terminal 552.

In the prior art, an internal modem of a local terminal was required to train with an internal modem of a remote terminal. Because there is a direct digital channel between local terminal 510 and RWI 538, local terminal 510 may use the internal modem of RWI 538 to communicate over PSTN 541. Therefore, the modem training task may be moved from local terminal 510 to RWI 538. Because the modem training task is moved to RWI 538, message propagation delay times between local terminal 510 and RWI 538 do not affect the modem training procedure. Only message propagation delay times between RWI 538 and remote terminal 552 affect the modem training procedure.

To establish an end-to-end communication channel, the internal modem of RWI 538 must train with the internal modem of remote terminal 552 to adaptively equalize the line and set near and far echo taps for echo cancellation. This is all performed digitally within the internal modems as part of the modem training task.

Near the beginning of the modem training procedure, capabilities messages may be exchanged between internal modems so that the internal modems determine a desired data rate. For some modes of operation, capabilities messages need not be exchanged.

Use of RWI 538 allows an end-to-end communication channel to be established between local terminal 510 and remote terminal 552 through more than two satellite hops without violating timing constraints associated with established protocols for modem training or capabilities message exchange.

FIG. 6 depicts message timing for a modem training and capabilities message exchange protocol in accordance with the present invention. As used in FIG. 6, "tx" is an abbreviation for "transmit" and "rx" is an abbreviation for "receive". This description refers also to FIG. 5 and associated text.

Modem training data rate determination is partially a function of the total available end-to-end communication channel bandwidth. The end-to-end communication channel bandwidth depends on the bandwidth of the digital channel and the bandwidth of PSTN 541. Because the bandwidth of the digital channel is generally lower than the bandwidth of PSTN 541, the bandwidth of the digital channel determines the rate of modem training for remote terminal 552. For example, if the digital channel bandwidth is 4800 bps and PSTN 541 bandwidth is 9600 bps, the allowable end-to-end modem training data rate is 4800 bps or lower.

For example, local terminal 510 may determine the digital channel bandwidth by sampling the clock rate of the digital radio network link. Alternatively, local terminal 510 may have predetermined the digital channel bandwidth, and local terminal 510 may have it configured into memory.

Local capabilities message 605 has digital channel bandwidth information. Therefore, for successful modem training between RWI 538 and remote terminal 552, RWI 538 must use the local signaling capabilities contained in local capabilities message 605 during the modem training procedure with remote terminal 552. In accordance with the present invention, RWI's internal modem is capable of supporting equal or higher bit rates than the digital channel.

Local terminal 510 transmits local capabilities message 605 (referred to also as LCM) to RWI 538 beginning at time 630. Transmission of local capabilities message 605 occurs prior to the modem training procedure (e.g., as soon as local terminal 510 goes off-hook).

RWI 538 receives local capabilities message 605 beginning at time 635. Receipt of local capabilities message 605 "pre-stages" RWI 538 for subsequent modem training with remote terminal 552.

The modem training procedure is initiated by RWI 538. For example, when local terminal 510 is a STU, RWI 538 initiates the modem training procedure when local terminal 510 informs RWI 538 that the user of local terminal 510 pressed the "secure" button. RWI 538 transmits RWI modem tone 610 (referred to also as RWIMT) to remote terminal 552 beginning at time 640. RWI 538 continues transmission of RWI modem tone 610 until RWI 538 begins reception of remote modem tone 615 (referred to also as RMT). For example, RWI modem tone 610 may be a 2100 Hz tone of limited duration.

Remote terminal 552 receives RWI modem tone 610 beginning at time 645. Remote terminal 552 may then wait a certain signaling delay time and transmit remote modem tone 615 to RWI 538 beginning at time 650. For example, remote modem tone 615 may be a P1800 Hz tone of limited duration.

RWI 538 receives remote modem tone 615 beginning at time 655. First response time-out interval 660, monitored by RWI 538, begins at time 640, when RWI 538 starts transmitting RWI modem tone 610. RWI 538 fails the call if it does not begin receiving remote modem tone 615 within first response time-out interval 660. Alternatively, RWI 538 may re-initiate the modem training procedure to attempt to establish communications with remote terminal 552.

Capabilities messages 606, 625 are exchanged between RWI 538 and remote terminal 552. Reformatted local capabilities message 606 (referred to also as LCM) represents a reformatted version of local capabilities message 605 received by RWI 538 at time 635. Remote capabilities message 625 (referred to also as RCM) transmitted by remote terminal 552 indicates the modem capabilities of remote terminal 552. Capabilities messages 606, 625 contain information which RWI 538 and remote terminal 552 use to select a common mode of operation (e.g., 4800 bit per second, secure data mode).

RWI 538 transmits reformatted local capabilities message 606 beginning at time 675. Remote terminal 552 receives reformatted local capabilities message 606 beginning at time 680.

Remote terminal 552 transmits remote capabilities message 625 beginning at time 685. Remote capabilities message 625 is received by RWI 538 beginning at time 690. Second response time-out interval 670, monitored by RWI 538, begins at time 675, when RWI 538 starts transmitting reformatted local capabilities message 606. RWI 538 fails the call if it does not begin receiving remote capabilities message 625 within second response time-out interval 670. Alternatively, RWI 538 may re-initiate the modem training procedure to attempt to establish communications with remote terminal 552.

FIG. 6 depicts message timing when local terminal 510 goes off-hook before remote terminal 552 goes off-hook. When remote terminal 552 goes off-hook first, message timing depicted in FIG. 6 is the same. A link is established between remote terminal 552 and RWI 538 when remote terminal 552 goes off-hook and dials the telephone number for local terminal 510. RWI 538 sends a "digital ring" to local terminal 510 until local terminal 510 goes off-hook. When local terminal 510 goes off-hook, local terminal 510 begins transmission of local capabilities message 605. Message exchange and timing continues in accordance with FIG. 6 and associated text.

Figure 7:
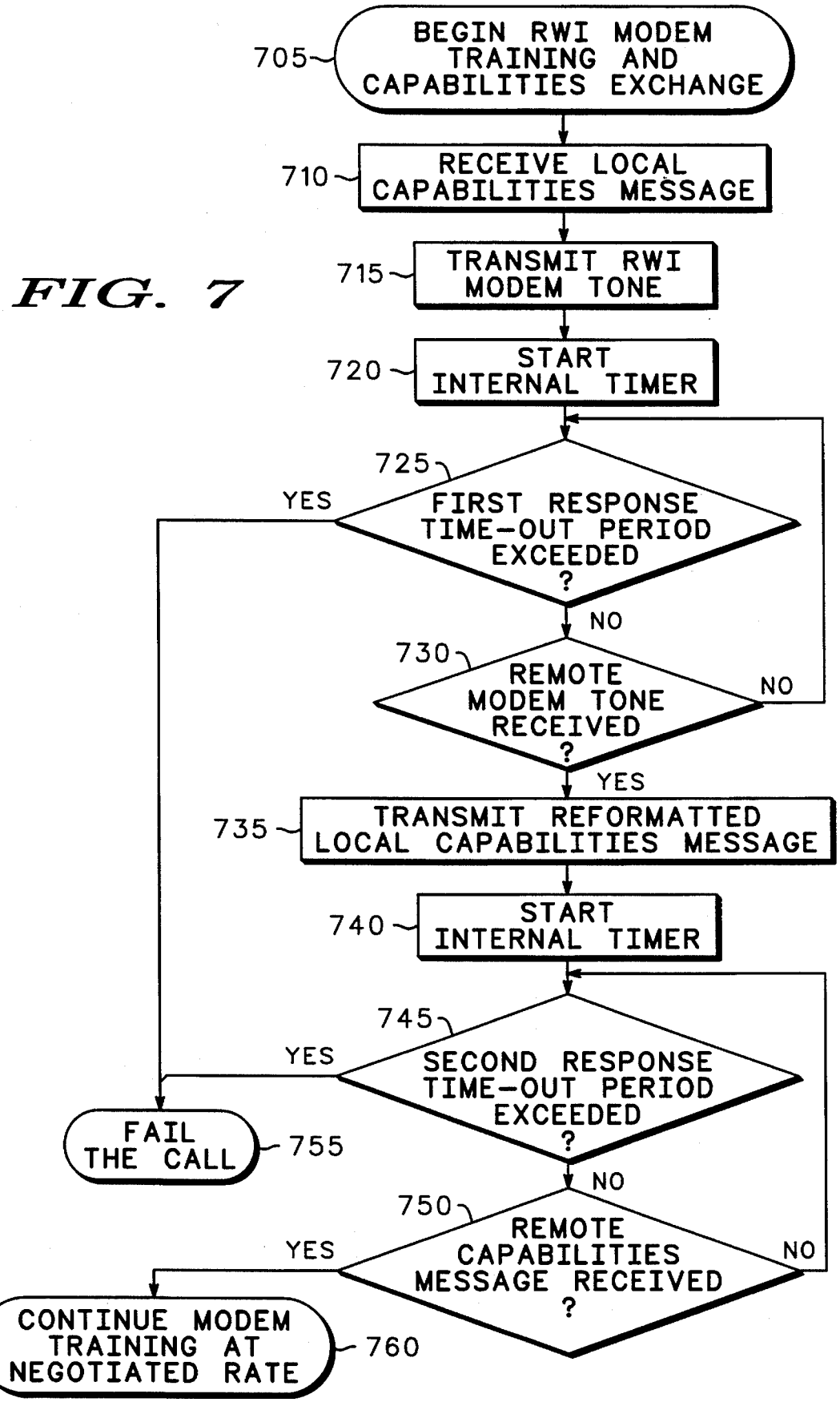
FIG. 7 shows a flow diagram of a method of RWI modem training and capabilities message exchange in accordance with the present invention.

FIG. 7 is a flow diagram of a preferred embodiment method of RWI modem training and capabilities message exchange. Referring also to FIGS. 5 and 6 and associated text, RWI modem training and capabilities message exchange begins (block 705) when RWI 538 receives local capabilities message 605 (block 710) from local terminal 510. RWI 538 must train its modem in accordance with local capabilities message 605 because the digital channel must eventually be capable of supporting the selected mode of operation.

RWI 538 initiates the modem training procedure between itself and remote terminal 552 by transmitting RWI modem tone 610 (block 715). RWI 538 starts an internal timer (block 720) when it begins transmission of RWI modem tone 610. RWI 538 then determines whether the internal timer value exceeds first response time-out interval 660 (block 725). When the internal timer value exceeds first response time-out interval 660 (block 725), RWI 538 assumes remote terminal 552 is nonexistent or incapable of establishing communications and RWI 538 fails the call (block 755), thus terminating the modem training procedure. For example, 3.3 +/−0.7 seconds is a standard first response time-out interval within the telecommunications industry.

When the internal timer value does not exceed first response time-out interval 660 (block 725), RWI 538 determines whether remote modem tone 615 has been received (block 730). When remote modem tone 615 has not been received (block 730), RWI 538 again determines whether first response time-out interval 660 has been exceeded (block 725). The procedure then iterates as shown in FIG. 7.

Determination of whether the internal timer value exceeds first response time-out interval 660 (block 725) and determination of whether remote modem tone 615 has been received (block 730) may be performed in either order.

When remote modem tone 615 has been received (block 730), RWI 538 transmits reformatted local capabilities message 606 (block 735).

In alternate embodiments, additional modem training messages may be exchanged prior to transmission of reformatted local capabilities message 606. Exchange of additional modem training messages prior to transmission of reformatted local capabilities message 606 does not limit the effectiveness of the present invention. Additionally, some systems do not require exchange of reformatted local capabilities message 606 and remote capabilities message 625. In such embodiments, the capabilities of one internal modem are already known to the other internal modem. The method of the present invention is applicable for such systems, as timing constraints during exchange of local modem tone 610 and remote modem tone 615 still exist.

RWI 538 starts an internal timer (block 740) when transmission of reformatted local capabilities message 606 begins. RWI 538 then determines whether the internal timer value exceeds second response time-out interval 670 (block 745). For example, 2.2 seconds is a standard second response time-out interval within the telecommunications industry.

When the internal timer value exceeds second response time-out interval 670 (block 745), RWI 538 fails the call (block 755), thus terminating the modem training procedure.

When the internal timer value does not exceed second response time-out interval 670 (block 745), RWI 538 determines whether remote capabilities message 625 has been received (block 750). When remote capabilities message 625 has not been received (block 750), RWI 538 again determines whether second response time-out interval 670 has been exceeded (block 745). The procedure then iterates as shown in FIG. 7.

Determination of whether the internal timer value exceeds second response time-out interval 670 (block 745) and determination of whether remote capabilities message 625 has been received (block 750) may be performed in either order.

When remote capabilities message 625 has been received (block 750), RWI 538 continues the modem training procedure (block 760) at the negotiated data rate and in accordance with the requirements of the internal modems of RWI 538 and remote terminal 552.

The method of the present invention is different from the prior art because the method of the present invention allows local terminal 510 to use the modem of RWI 538 to communicate with the modem of remote terminal 552. RWI 538 trains its modem with the modem of remote terminal 552 using signaling capabilities of local terminal 510.

Because local terminal 510 uses the modem of RWI 538, message propagation delays between local terminal 510 and RWI 538 do not affect the modem training procedure. Therefore, the method of the present invention allows more satellite hops to exist between local terminal 510 and remote terminal 552 than prior art protocols allow.

Figure 8:
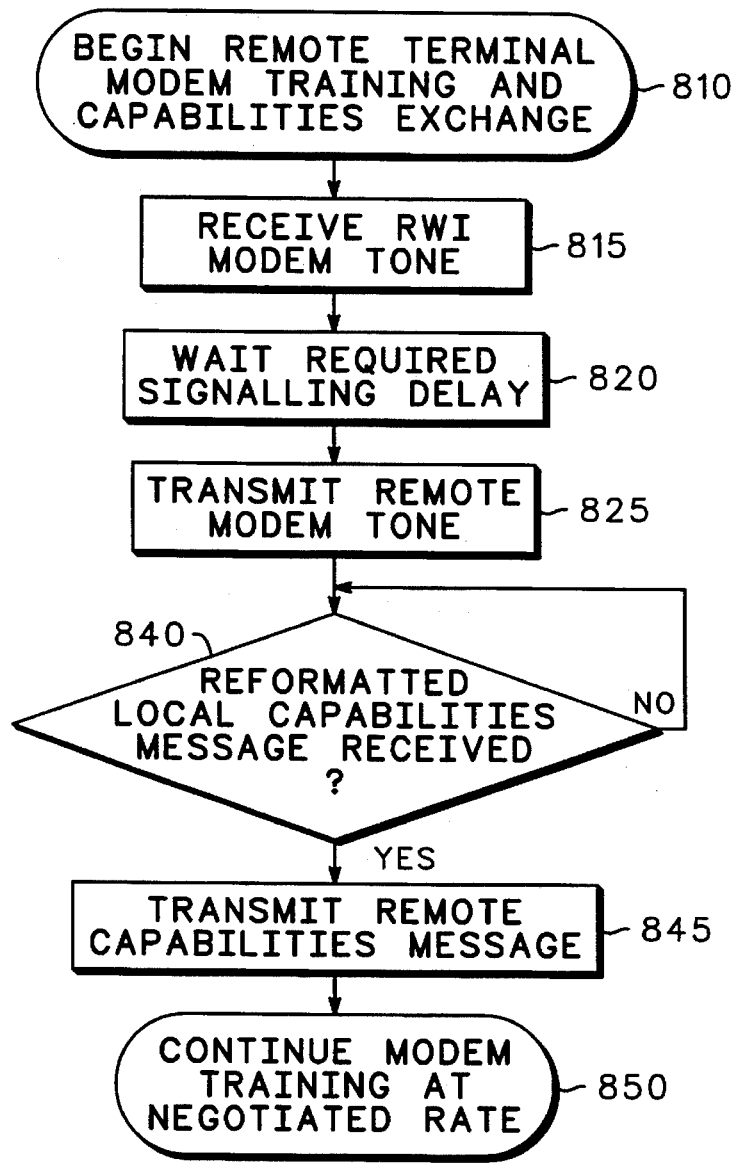
FIG. 8 shows a flow diagram of a method of remote terminal modem training and capabilities message exchange in accordance with the present invention.

FIG. 8 is a flow diagram of a preferred protocol of remote terminal modem training and capabilities message exchange. Referring also to FIGS. 5 and 6 and associated text, remote terminal modem training and capabilities message exchange begins (block 810) when remote terminal 552 receives RWI modem tone 610 (block 815). Remote terminal 552 then waits a required signaling delay time (block 820). For example, a required signaling delay time may be zero seconds (no delay) or one second. After the required signaling delay time has expired (block 820), remote terminal 552 transmits remote modem tone 615 (block 25).

Remote terminal 552 then determines whether reformatted local capabilities message 606 has been received (block 840). When reformatted local capabilities message 606 has not been received, remote terminal 552 continues to monitor until reformatted local capabilities message 606 is received. When remote terminal 552 receives reformatted local capabilities message 606 (block 840), remote terminal 552 transmits remote capabilities message 625 (block 845). Remote terminal 552 then continues the modem training procedure (block 850) at the negotiated data rate and in accordance with the requirements of the internal modems of RWI 538 and remote terminal 552.

The method of remote terminal modem training and capabilities message exchange is different from the prior art protocol because the source of the modem tone received in block 815 is different. This difference is transparent to remote terminal 552.

Figure 9:
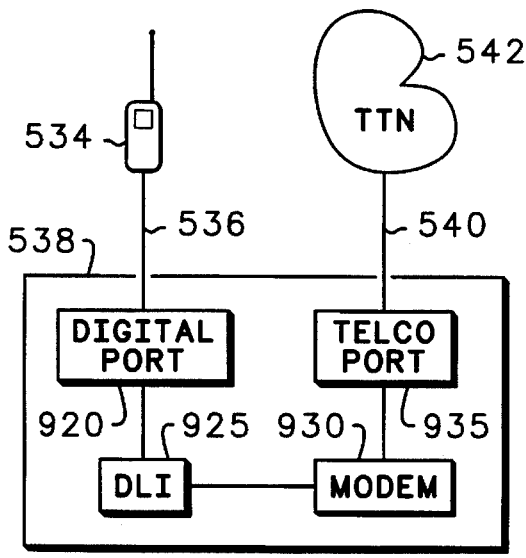
FIG. 9 shows an apparatus for a radio wireline interface in accordance with the present invention.

FIG. 9 illustrates a preferred embodiment of RWI 538 in accordance with the present invention. RWI 538 comprises digital data port 920 (referred to hereinafter as digital port (920)), digital link interface 925 (referred to hereinafter as DLI (925)), internal modem 930 and telephone company port 935 (referred to hereinafter as telco port (935)).

Referring also to FIGS. 5 and 6 and associated text, RWI 538 has digital port 920 connected to radio unit 534 via link 536. Digital port 920 connects to DLI 925. DLI 925 receives and formats local capabilities message 605. DLI 925 then transmits reformatted local capabilities message 606 during the modem training procedure. DLI 925 also performs error handling, traffic control for internal modem 930 and digital port 920, interrupt handling, call setup signaling and other control functions. Internal modem 930 modulates digital bitstreams from DLI 925 for transmission over TTN 542. Internal modem 930 also demodulates incoming modulated carriers received from TTN 542. Internal modem 930 is coupled to telco port 935. Telco port 935 connects RWI 538 to TTN 542 via link 540.

For example, internal modem 930 is usefully a Type STU-III modem available from Motorola, AT&T or Martin Marietta. Internal modem 930 is built according to FSVS-210 specifications. DLI 925 is usefully a Type M68302 communication processor available from Motorola, Inc. of Austin, Tex. Digital port 920 is usefully a standard RS-232-E synchronous digital port and telco port 935 is usefully a standard 2 wire/4 wire telco interface port corresponding to FCC-68.

Figure 10:
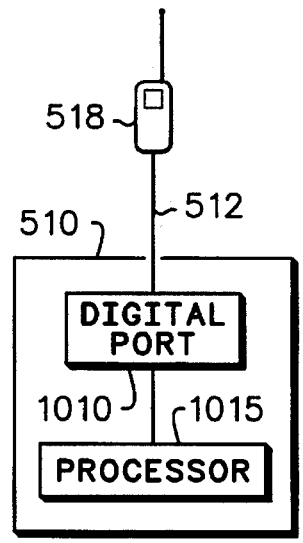
FIG. 10 shows an apparatus for a local terminal in accordance with the present invention.

FIG. 10 illustrates a preferred embodiment of local terminal 510 in accordance with the present invention. Referring also to FIGS. 5 and 6 and associated text, local terminal 510 comprises digital port 1010 and processor 1015. Processor 1015 sends local capabilities message 605 to RWI 538 when a digital communication link is desired.

Radio unit 518 is coupled to digital port 1010 via link 512. Processor 1015 creates and manipulates digital bitstreams that are sent and received through digital port 1010. Local terminal 510, used in accordance with the present invention, differs from a prior art local terminal because it has the ability to establish a direct digital link with another communication device (e.g., RWI 538) and send its local capabilities message 605.

Processor 1015 is usefully a Type DSP5600x digital signal processor available from Motorola, Inc. of Austin, Tex. Digital port 1010 is usefully a standard RS-232-E synchronous digital port.

By transmitting local terminal capabilities message 605 to RWI 538 prior to the modem training procedure, the method of the present invention moves the modem training timing constraints from local terminal 510 to RWI 538 and allows modem training and capabilities message exchange to occur in systems with more than two satellite hops without violating signaling timing constraints.

After local terminal capabilities message 605 has been transmitted by local terminal 510, the order in which modem training messages are exchanged between remote terminal 552 and RWI 538 is not critical to the present invention. The order in which modem training messages are exchanged described in the detailed description is not to be construed as limiting in any manner.

The number of satellite hops (e.g., satellites 530, FIG. 5) between local terminal 510 and RWI 538 is not limited to two for the present invention to be useful because modem training timing constraints only apply between RWI 538 and remote terminal 552. The number of satellite hops (e.g., satellites 531, FIG. 5) between RWI 538 and remote terminal 552 is limited by the modem training timing constraints of the communication system.

Example

Table 2 summarizes approximate timing delays inherent in preferred embodiment communication system 501 depicted in FIG. 5 As used in Table 2, "start" is the element number in FIG. 5 where the delay originates and "end" is the element number in FIG. 5 where the delay ends.

TABLE 2

PREFERRED EMBODIMENT COMMUNICATION SYSTEM TIMING DELAYS

| start | end | delay explanation | delay |
|---|---|---|---|
| 538 | 552 | two satellite hops | .6 sec |
| 552 | 538 | two satellite hops | .6 sec |
| 538 | | modem processing delay | .1 sec |
| | | total | 1.3 sec |

The total round trip delay between RWI 538 and remote terminal 552 is 1.3 seconds which is within the standard second response time-out interval of 2.2 seconds. This means that the preferred embodiment solution works with two or more satellite hops on the PSTN (e.g., PSTN 541) side and multiple satellite hops on the radio side.

It is appreciated by those of skill in the art that the improved modem training method and apparatus described above allows an end-to-end communication channel to be established when more than two satellite hops exist between the local and remote terminals. This ability allows greater communication range between the local and remote terminals in a communication system.

What is claimed is:

1. A communication system apparatus for transmitting and receiving data, the apparatus comprising:

a radio wireline interface;

a local communication terminal for transmitting and receiving data linked to the radio wireline interface through at least one satellite of a digital radio network including multiple satellites, the local communication terminal including a local signaling capability including channel capabilities of the digital radio network; and a remote communication terminal for transmitting and receiving data linked to the radio wireline interface through multiple terrestrial telephone networks, wherein the terrestrial telephone networks are linked through at least one other satellite, the remote communication terminal comprising a remote internal modem with remote modem capabilities, wherein the radio wireline interface receives a local signaling capabilities message including the channel capabilities transmitted by the local communication terminal prior to establishment of a connection between the local communication terminal and the remote communication terminal and subsequently initiates a modem training procedure between the radio wireline interface and the remote internal modem where a round-trip delay between the local communication terminal and the remote communication terminal exceeds a time-out period.

2. A communication system apparatus as claimed in claim 1 wherein the radio wireline interface comprises:

a digital data port for transmitting and receiving digital data, the digital data port adapted to interface with the local communication terminal via the digital radio network;

a radio wireline interface internal modem for receiving the local signaling capabilities message and for initiating the modem training procedure between the radio wireline interface and the remote internal modem;

a telephone company interface for transmitting and receiving telephone network data, the telephone company interface coupled to the radio wireline interface internal modem and adapted to interface with the remote communication terminal; and a digital link interface for performing processing and control functions, the digital link interface coupled to the digital data port and coupled to the radio wireline interface internal modem, the digital link interface for receiving the local signaling capabilities message and formatting the local signaling capabilities message into a reformatted signaling capabilities message, wherein the radio wireline interface internal modem uses the reformatted signaling capabilities message during the modem training procedure between the radio wireline interface internal modem and the remote internal modem.

3. A communication system apparatus as claimed in claim 1 wherein the local communication terminal comprises:

a local digital data port for transmitting and receiving digital data, the digital data port adapted to interface with the radio wireline interface via the digital radio network; and a processor coupled to the local digital data port, the processor for transmitting the local signaling capabilities message to the radio wireline interface prior to the modem training procedure between the radio wireline interface and the remote internal modem.

4. A method for controlling a radio wireline interface, in a communication system comprising a digital radio network including multiple satellites, a local communication terminal linked to the digital radio network, a remote communication terminal linked to a terrestrial telephone network and the radio wireline interface, wherein the radio wireline interface is linked to the local communication terminal through at least one satellite of the digital radio network and the radio wireline interface is linked to the remote communication terminal through the terrestrial telephone network, at least one other satellite, and at least one other terrestrial telephone network, the local communication terminal including local signaling capabilities including channel capabilities of the digital radio network, the remote communication terminal comprising a remote internal modem with remote modem capabilities and the radio wireline interface comprising a radio wireline interface internal modem, the method comprising the steps of:

(a) receiving by the radio wireline interface a local signaling capabilities message describing the local signaling capabilities from the local communication terminal prior to establishment of a connection between the local communication terminal and the remote communication terminal;

(b) formatting by the radio wireline interface the local signaling capabilities message into a reformatted signaling capabilities message; and (c) performing the modem training procedure between the radio wireline interface internal modem and the remote internal modem.

5. A method as claimed in claim 4 wherein step (c) comprises the steps of:

a. initiating the modem training procedure between the radio wireline interface internal modem and the remote internal modem by sending a local modem tone from the radio wireline interface to the remote internal modem after receiving the local signaling capabilities message by the radio wireline interface;

b. initializing a first running timer to a first running timer value at a time when the initiating step commences;

c. comparing the first running timer value to a first delay time-out value;

d. determining whether a remote modem tone from the remote internal modem has been received by the radio wireline interface;

e. discontinuing the modem training procedure when the first running timer value exceeds the first delay time-out value and the local modem tone has not been received;

f. transmitting the reformatted signaling capabilities message to the remote internal modem when the local modem tone is received and the first running timer value has not exceeded the first delay time-out value;

g. initializing a second running timer to a second running timer value at a time when the transmitting step commences;

h. comparing the second running timer value to a second delay time-out value;

i. determining whether a remote modem capabilities message describing the remote modem capabilities has been received by the radio wireline interface;

j. discontinuing the modem training procedure when the second running timer value exceeds the second delay time-out value and the remote modem capabilities message has not been received; and k. continuing the modem training procedure when the remote modem capabilities message is received and the second running timer value has not exceeded the second delay time-out value.

6. A method of establishing a communication link in a communication system including a local communication terminal, a remote communication terminal, and a radio wireline interface, the local communication terminal including a local internal modem and local signaling capabilities including channel capabilities of a digital radio network, the local communication terminal linked to the radio wireline interface through at least one satellite of the digital radio network, the remote communication terminal including a remote internal modem with remote modem capabilities, the remote communication terminal linked to the radio wireline interface through at least one satellite-linked terrestrial telephone network, and the radio wireline interface including a radio wireline interface internal modem, the method comprising the steps of:

(a) sending a local signaling capabilities message describing the local signaling capabilities from the local communication terminal to the radio wireline interface prior to establishment of a connection between the local communication terminal and the remote communication terminal;

(b) formatting the local signaling capabilities message by the radio wireline interface into a reformatted signaling capabilities message which is consistent with a format required during a modem training procedure between the radio wireline interface internal modem and the remote internal modem; and (c) performing the modem training procedure between the radio wireline interface internal modem, the local internal modem, and the remote internal modem.

7. A method as claimed in claim 6 wherein step (c) comprises the steps of:

a. initiating the modem training procedure between the radio wireline interface internal modem and the remote internal modem by sending a local modem tone from the radio wireline interface internal modem to the remote internal modem;

b. receiving the local modem tone by the remote internal modem;

c. sending a remote modem tone from the remote internal modem;

d. receiving the remote modem tone by the radio wireline interface internal modem;

e. sending the reformatted signaling capabilities message from the radio wireline interface;

f. receiving the reformatted signaling capabilities message by the remote internal modem;

g. sending a remote modem capabilities message describing the remote modem capabilities from the remote internal modem;

h. receiving the remote modem capabilities message by the radio wireline interface internal modem; and i. continuing the modem training procedure in accordance with a modem training protocol between the remote internal modem, the local internal modem, and the radio wireline interface internal modem.

8. A radio wireline interface apparatus comprising:

a digital data port for transmitting and receiving digital data from a local communication terminal linked to the digital data port through a digital radio network including multiple satellites;

a telephone company port for transmitting and receiving telephone data from a remote communication terminal linked to the telephone company port through a terrestrial telephone network, at least one other satellite, and at least one other terrestrial telephone network;

a radio wireline interface internal modem coupled to the telephone company port, the radio wireline interface internal modem for training with a remote internal modem of a remote communication terminal and for modulating and demodulating data going to and coming from the telephone company port; and a digital link interface coupled to the digital data port and coupled to the radio wireline interface internal modem, wherein the digital link interface:

receives a local signaling capabilities message describing local signaling capabilities including channel capabilities of a digital radio network from a local communication terminal through the digital data port prior to establishment of a connection between the local communication terminal and the remote communication terminal;

formats the local signaling capabilities message into a reformatted signaling capabilities message; and allows access to the reformatted signaling capabilities message by the radio wireline interface internal modem, the radio wireline interface internal modem transmits the reformatted signaling capabilities message through the telephone company port to the remote internal modem during the modem training procedure between the radio wireline interface internal modem and the remote internal modem.

9. A local communication terminal apparatus for communicating in a communication system including multiple satellites, a radio wireline interface, and a remote communication terminal, the local communication terminal comprising:

a digital data port for interfacing the local communication terminal apparatus with at least one of the multiple satellites; and a processor coupled to the digital data port, the processor for formatting a local signaling capabilities message describing local signaling capabilities of the local communication terminal apparatus and for transmitting the local signaling capabilities message via the digital data port to the radio wireline interface prior to a modem training procedure between the local communication terminal apparatus and the remote communication terminal, wherein the radio wireline interface is linked to the local communication terminal through at least one of the multiple satellites, and the radio wireline interface transmits information contained in the local Signaling capabilities message to the remote communication terminal through at least another of the multiple satellites.

10. An interface apparatus including a first modem, the interface apparatus for use in a communications system including a first terminal separated from the interface apparatus by a digital communications link having a first bandwidth, wherein the digital communications link includes one or more satellite hops and a first delay, and wherein the communications system includes a second terminal separated from the interface apparatus by a telephone link having a second bandwidth, wherein the second terminal includes a second modem adapted for training with the first modem, wherein the telephone link includes one or more satellite hops and a second delay, the end to end delay comprising the sum of the first delay, twice the second delay and a third delay associated with the interface apparatus, the interface apparatus comprising:

a digital port;

a digital link interface coupled to the digital port and to the first modem; and a telephone port coupled to the first modem, wherein the first modem is configured for:
  a. receiving a local capabilities message from the first terminal via the digital communications link;
  b. reformatting the local capabilities message to provide a reformatted local capabilities message;
  c. transmitting the reformatted local capabilities message via the telephone link; and
  d. initiating training between the first modem and the second modem to determine a mutual communications protocol.

11. An interface apparatus as claimed in claim 10, wherein the apparatus includes a timer coupled to the first modem, the timer for measuring a first interval of a first duration, wherein, when the second delay exceeds the first interval, communication between the first and second modems is terminated and the step (d) is not carried out.

12. An interface apparatus as claimed in claim 10, wherein the apparatus includes bandwidth assessing means for assessing the first bandwidth to provide a first assessed bandwidth, the bandwidth assessing means coupled to the first modem, and wherein the first assessed bandwidth is assessed in part based on reception of the local capabilities message, the step (c) is carried out at a data rate consistent with the first assessed bandwidth and the step (d) is carried out at the data rate.

13. An interface apparatus as claimed in claim 10, wherein the apparatus includes a timer coupled to the first modem, the timer for measuring a first interval of a first duration, wherein, when the end to end delay exceeds the first interval and the second delay is less than the first interval, proceeding to the step (d).

14. In a system including:

an interface apparatus including a first modem, the interface apparatus for use in a communications system, a first terminal separated from the interface apparatus by a digital communications link having a first bandwidth, wherein the digital communications link includes one or more satellite hops and a first delay, and a second terminal separated from the interface apparatus by a telephone link having a second bandwidth, wherein the second terminal includes a second modem adapted for training with other modems, wherein the telephone link includes one or more satellite hops and a second delay, the end to end delay comprising the sum of the first delay, the second delay and a third delay associated with the interface apparatus, a method for operating the interface apparatus, the method comprising the steps of:
  a. receiving a local capabilities message from the first terminal via the digital communications link;
  b. reformatting the local capabilities message to provide a reformatted local capabilities message;
  c. transmitting the reformatted local capabilities message via the telephone link; and
  d. initiating training between the first modem and the second modem prior to establishing communications between the first terminal and the second terminal.

15. A method as claimed in claim 14, wherein the method includes the substeps of:
  a.1. determining a bandwidth of the digital communications link; and
  c.1. transmitting the bandwidth in the reformatted local capabilities message.

16. A method as claimed in claim 14, wherein the method further includes the substeps of:
  c.1. waiting for a first interval having a first duration following the transmitting step;
  c.2. proceeding to step (d) when a reply from the second terminal is received during the first interval;
  c.3. terminating communication with the second terminal when no reply is received from the second terminal during the first interval; and
  c.4. sending a message to the first terminal indicating that no reply was received from the second terminal during the first interval.

17. A method as claimed in claim 15, wherein the method further includes the substeps of:
  c.2. waiting for a first interval having a first duration following the transmitting step; and
  c.3. proceeding to the step (d) when a reply from the second terminal is received during the first interval and a sum of the first delay and twice the second delay exceeds the first interval.

18. A method as claimed in claim 17, wherein the method further includes the substeps of:
  c.4. waiting for a first interval having a first duration following the transmitting step, and
  c.5. proceeding to the step (d) when a reply from the second terminal is received during the first interval and a sum of the first delay and twice the second delay is less than or equal to the first interval.

19. A method as claimed in claim 18, wherein the method further includes the substeps of:
  c.6. terminating communication with the second terminal when no reply is received from the second terminal during the first interval; and
  c.7 sending a message to the first terminal indicating that no reply was received from the second terminal during the first interval.

* * * * *

UNITED STATES PATENT AND TRADEMARK OFFICE
CERTIFICATE OF CORRECTION

PATENT NO. : 5,504,802
DATED : April 2, 1996
INVENTOR(S) : Paul R. Kennedy et al.

It is certified that error appears in the above-identified patent and that said Letters Patent is hereby corrected as shown below:

In column 14, claim 4, line 12, delete ",".

In column 16, claim 9, line 60, delete "Sig-" and insert --sig---.

Signed and Sealed this

Fourteenth Day of October, 1997

Attest:

BRUCE LEHMAN

Attesting Officer

Commissioner of Patents and Trademarks